US00RE38578E1

(19) United States
(12) Reissued Patent
Vercaemer et al.

(10) Patent Number: US RE38,578 E
(45) **Date of Reissued Patent: *Sep. 14, 2004**

(54) METHOD AND APPARATUS FOR CEMENTING A WELL

(75) Inventors: Claude J. Vercaemer, London (GB); Brian Darling, Sugar Land, TX (US)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

(21) Appl. No.: 10/184,996

(22) Filed: Jun. 28, 2002

Related U.S. Patent Documents

Reissue of:
(64) Patent No.: 6,085,838
Issued: Jul. 11, 2000
Appl. No.: 08/863,652
Filed: May 27, 1997

(51) Int. Cl.[7] ..... E21B 23/08
(52) U.S. Cl. ..... 166/277; 166/285; 166/177.4; 166/207
(58) Field of Search ..... 166/277, 285, 166/380, 177.4, 207

(56) References Cited

U.S. PATENT DOCUMENTS

| | | | | |
|---|---|---|---|---|
| 3,353,599 A | * 11/1967 | Swift | ..... | 166/207 |
| 3,412,565 A | * 11/1968 | Lindsey et al | ..... | 166/207 |
| 3,669,190 A | 6/1972 | Sizer et al. | ..... | 166/315 |
| 4,976,322 A | * 12/1990 | Abdrakhmanov et al. | | |
| 5,083,608 A | * 1/1992 | Abdrakhmanov et al. | | |
| 5,119,661 A | * 6/1992 | Abdrakhmanov et al. | | |
| 5,348,095 A | * 9/1994 | Worrall et al. | | |
| 5,366,012 A | * 11/1994 | Lohbeck | | |
| 5,667,011 A | * 9/1997 | Gill et al. | ..... | 166/207 |

FOREIGN PATENT DOCUMENTS

| | | | | |
|---|---|---|---|---|
| SU | 0976019 | * 11/1982 | ..... | 166/207 |
| WO | 93/25799 | 12/1993 | | |
| WO | 093025799 | * 12/1993 | ..... | 166/207 |
| WO | WO 96/37680 | * 11/1996 | | |
| WO | WO 96/37681 | * 11/1996 | | |
| WO | 98/00626 | 1/1998 | | |
| WO | WO 98/00626 | * 1/1998 | | |
| WO | WO 98/22690 | * 5/1998 | | |
| WO | WO 98/26152 | * 6/1998 | | |
| WO | WO 98/42947 | * 10/1998 | | |

OTHER PUBLICATIONS

Barker, J.W. (Mar. 1997), Wellbore Design With Reduced Clearance Between Casing Strings, *Society of Petroleum Engineers*, SPE/IACD 37615, 341–349.*

Rothermund, Heinz, Shell Expro Managing Director, Shell U.K. Exploration and Production. "Accelerating the Application of New Well Technology", Brochure produced by Publications and Cartography Services, UEPS/21, (Jun. 1996).*

(List continued on next page.)

*Primary Examiner*—William Neuder
(74) *Attorney, Agent, or Firm*—Stephen Schlather; Brigitte Jeffery

(57) ABSTRACT

A method of cementing a well permitting a reduction in the degree of diameter reduction of casing or liners required, and not requiring excessively large initial conductor casing, is described. The method is characterized by provision of an enlarged wellbore and a novel liner structure which is adapted for expansion of a reduced diameter section thereof downhole, providing, before expansion of the section, unimpeded flow of fluid from the enlarged wellbore during cementing and close fit of the expanded section with the casing or preceding liner, after cementing is completed and expansion of the section. A novel well liner structure and novel well liner expansion means are disclosed.

16 Claims, 3 Drawing Sheets

OTHER PUBLICATIONS

Rothermund, Heinz, Shell Expro Managing Director, Shell U.K. Exploration and Production. "The Challenge of Drilling in the New Millenium", Brochure produced by Publications and Cartography Services UEPS/2 (Sep. 1996).*

SPE 37615 *Wellbore Design With Reduced Clearance Between Casing Strings* by J.W. Barker.

*Accelerating the application of New Well Technology*—Brochure produced by publications and Cartography Services, UEPS/Jun. 21, 1996 by Heinz Rothermund, Shell Expro Managing Director—Shell U.K. Exploration and Production.

*The Challenge of Drilling in the New Millenium*—Brochure produced by publications and Cartography Services, UEPS/Jun. 2, 1996 by Heinz Rothermund, Shell Expro Managing Director—Shell U.K. Exploration and Production.

*Expandable Tube is Novel Tool For Difficult Completions Drilling* Jun. 3, 1996, by D.S. Gill et al.,—Oil and Gas Journal, vol. 94, pp. 37–40.

Claude J. Vercaemer, Invention Disclosure, "Drillable Liner", dated on or about Dec. 1, 1998 and previously on Jul. 1, 1998.*

* cited by examiner

METHOD AND APPARATUS FOR CEMENTING A WELL

Matter enclosed in heavy brackets [ ] appears in the original patent but forms no part of this reissue specification; matter printed in italics indicates the additions made by reissue.

FIELD OF THE INVENTION

This invention relates to a method for cementing a well and to apparatus useful in well cementing operations.

BACKGROUND OF THE INVENTION

In the conventional drilling of a well, such as an oil well, a series of casings and/or liners are commonly installed sequentially in the wellbore or borehole. In standard practice, each succeeding liner placed in the wellbore has an outside diameter significantly reduced in size when compared to the casing or liner previously installed. Commonly, after the installation of each casing or liner, cement slurry is pumped downhole and back up into the space or annulus between the casing or liner and the wall of the wellbore, in an amount sufficient to fill the space. The cement slurry, upon setting, stabilizes the casing or liner in the wellbore, prevents fluid exchange between or among formation layers through which the wellbore passes, and prevents gas from rising up the wellbore.

The use of a series of liners which have sequentially reduced diameters is derived from long experience and is aimed at avoiding problems at the time of insertion of casing or liner installation in the wellbore. The number of liners or casings required to reach a given target location is determined principally by the properties of the formations penetrated and by the pressures of the fluids contained in the formations. If the driller encounters an extended series of high pressure/low pressure configurations, the number of liners required under such circumstances may be such that the well cannot usefully be completed because of the continued reduction of the liner diameters required. Again, a further problem of the standard well liner configuration is that large volumes of cuttings are produced initially, and heavy logistics are required during early phases of drilling.

While several approaches to the resolution of these problems have been attempted, none have proven totally satisfactory. Accordingly, there has existed a need for a well lining and cementing technique or procedure, and means to carry it out, which would eliminate or significantly reduce the degree of diameter reduction required when a series of well liners must be inserted. The invention addresses this need.

SUMMARY OF THE INVENTION

There is thus provided, in one embodiment, a method or process, useful in cementing a well, especially a hydrocarbon well, which is characterized by the use of increased external and internal diameter liners, i.e., by a reduction in the degree of diameter reduction of the liners required, and which does not require excessively large initial conductor casing or surface pipe. Accordingly, in this embodiment, the invention relates to a method of cementing a wellbore in which a casing or first liner is provided in a wellbore. (As utilized herein, the terms "first" and "second", etc., in relation to the casing or liners mentioned, are relative, it being understood that, after the initial "second" casing or liner is cemented, it may become a "first" liner for the next cementing operation as such operations proceed down the wellbore.)

Further drilling operations are then conducted to provide an enlarged wellbore. As used herein, the term "enlarged wellbore" refers to a wellbore or borehole having a diameter greater than that of the internal diameter of the casing or preceding liner, preferably greater than the external diameter of the casing or preceding liner, such a wellbore being provided or drilled in a manner known to those skilled in the art, as described more fully hereinafter. At a desired depth, or when it is otherwise decided to line and cement the enlarged wellbore, a second liner, whose greatest external (outside) diameter approximates, i.e., is only slightly smaller than the internal diameter of the casing or first liner provided, is then provided in the enlarged wellbore through the casing or first liner. The second liner comprises a [minor] section or segment of significantly or further reduced external and internal diameter (in relation to the remaining or remainder segment of the second liner) and is composed, at least in said [minor] section, of a deformable liner material. According to the invention, the second liner is positioned in relation to the enlarged wellbore so that the section of reduced external diameter is located or positioned in the lower portion of the casing or first liner and the remainder segment below the lower portion, in such manner that fluid may circulate freely, i.e., without substantial or significant impediment, in the annuli formed by the second liner and the enlarged wellbore and the internal wall of the casing or first liner.

Inside the bore of the [larger] remaining or remainder segment of the second liner there is disposed or provided, as more fully described hereinafter, a movable, fluid tight die member of appropriate dimensions, preferably positioned in the second liner distant from the bottom of the remainder segment and proximate the [minor] section of reduced external and internal diameter, and which, after initial positioning or installation in the enlarged wellbore, is fixed in relation to said wellbore. As utilized herein, the phrase "fluid tight", in reference to the die member, is understood to indicate that the die member is appropriately sized and shaped and contains appropriate sealing means to prevent significant passage of fluid, even under substantial pressure, as described hereinafter, past its periphery or circumference which is contiguous to the interior wall or bore of the remainder segment of the second liner. The fluid tight die member, including the sealing means, is further a component or element of the novel die-expansion assembly of the invention which comprises means for transmitting a fluid to the bore of a liner, and means for connecting the die member to a drillstring. The latter means are important in positioning the novel liner-die assembly in the enlarged wellbore initially, as described more fully hereinafter, and in responding to applied fluid pressure. As utilized herein, the term "drillstring" is understood to include tool members or collars, etc., normally utilized in wellbore operations. In the specific context of the invention, the die-expansion assembly comprises means for transmitting a fluid to the bore of the remainder segment of the second liner, to the end that a fluid under significant pressure may be applied to the bore of the remainder segment of the second liner, and further comprises means for connecting the die member to a drillstring.

According to the method of the invention, upon proper positioning of the liner-die assembly of the invention in the wellbore, cement slurry is then pumped down the drillstring through the casing or first liner and the second liner (via the means for transmitting a fluid) and into the enlarged wellbore annulus in an amount sufficient to cement the wellbore annulus. After the cement is in place, the bottom or bottom end of the second liner is sealed, by standard techniques known to those skilled in the art, to prevent egress of fluid from the liner. As utilized herein, reference to the "bottom" or "bottom end" of the liner is to be construed as referring to a site downhole on or in the liner rather than as a precise location of the liner body. The sealing of the bottom end of the liner, coupled with the seal provided by the fluid tight die member, provides or constitutes, assuming a location of the die member removed or distant from the bottom of the liner, and, with the exception of communication with the aforementioned means for transmitting a fluid, a sealed compartment or recess in the bore of the remainder segment of the second liner. Substantial fluid pressure is then applied to the interior of this sealed remainder segment recess by pumping a fluid, e.g., a wellbore fluid such as a drilling fluid or a spacer fluid, through said means for transmitting a fluid which communicates with the compartment or recess. As fluid under pressure is introduced into the otherwise sealed recess, the increasing pressure therein tends to force the fluid tight die member up the second liner bore. According to the invention, as fluid pressure is increased in the sealed recess, the position of the die-expansion assembly, including the die member, is mechanically adjusted or allowed to adjust by translation upward in the liner (and the wellbore). The rate of upward adjustment or movement of the die-expansion assembly by upward movement of the running string and the application of pressure to the second liner bore recess are correlated so as to produce movement of the die member up through the section of reduced diameter with concurrent gradual deformation and expansion of the section of reduced diameter, providing an expanded section or segment having an external diameter equal to or approximating, preferably slightly greater or larger than that of the remainder segment of the second liner, as described more fully hereinafter. The expansion of the section provides an external diameter for the section which more closely approximates the internal diameter of the casing or first liner, while providing a larger flow passage internally for production fluids. Continued application of fluid pressure and correlated upward translation or adjustment of the position of the die-expansion assembly frees the die member from the second liner, the second liner then being positioned or allowed to remain with a substantial minor portion of the newly expanded segment in the casing or first liner. The cement slurry in the wellbore annulus is then allowed to set.

In yet further embodiments, the invention relates to a novel liner, which may additionally include expansion means therein; to an apparatus or tool for expansion of a liner having a reduced diameter section; and to a novel liner-die assembly or combination which is useful in cementing operations. More particularly, the liner of the invention comprises a wellbore liner having a [minor] section of reduced external and internal diameter composed of a deformable material and a [larger] remainder section of increased external and internal diameter. The expansion device or apparatus of the invention comprises unique fluid tight die means adapted for expansion of a liner section of reduced internal and external diameter, and preferably comprises a means for transmitting a fluid, e.g., a pipe; a die member adapted for expanding, at least substantially uniformly, the bore of a liner, on the periphery of said pipe; and sealing means positioned on the periphery of the die member adapted to provide a fluid tight seal between the bore of a liner and said die member. In the preferred arrangement, the pipe is provided at one end thereof with means for connecting the pipe to, or for suspending the pipe from, a drillstring, and is further preferably provided at the opposite end thereof with means for suspending a tool, preferably components used in cementing operations, and, especially, in one aspect of the invention, means to assist in sealing the end of the liner distant from said opposite end of the pipe.

The invention further relates to a novel liner-die assembly. In this aspect, the invention comprises the novel wellbore liner in which there is disposed the die-expansion assembly of the invention, as described, the assembly being disposed in said liner with the longitudinal axis of the means for transmitting fluid, or pipe, coincident with the axis of the liner and the fluid tight die member positioned in the remainder segment of the liner.

DETAILED DESCRIPTION OF THE INVENTION

Figure 1:
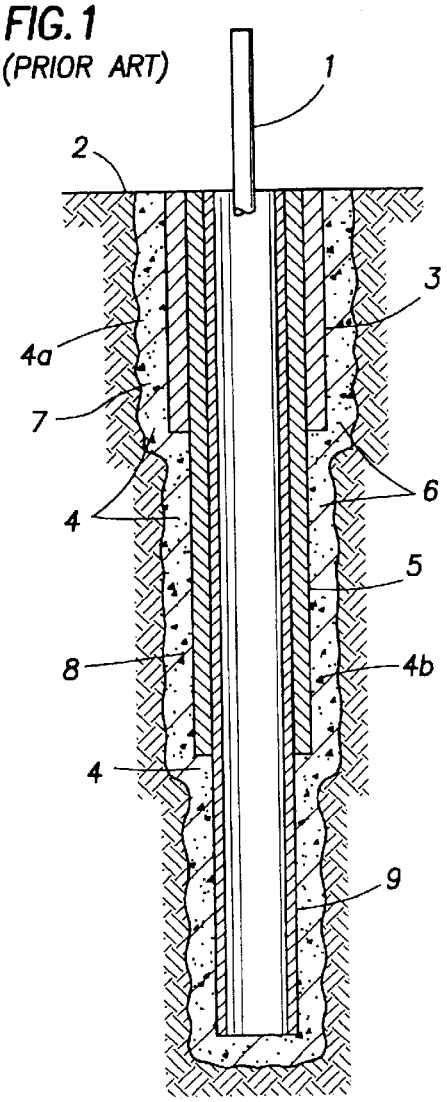
FIG. 1 (PRIOR ART)
FIG. 1 illustrates schematically the prior art practice of telescoping liner sections.

For a fuller understanding of the invention, reference is made to the drawing. Accordingly, in FIG. 1 there is shown a well string 1 extending to the earth surface 2 and to conductor pipe or casing 3. Conductor pipe 3 is positioned in the portion 4a of wellbore 4, while pipe 5 is in reduced diameter section 4b of the same wellbore. The wellbore forms segmented annulus 6 with pipes 3 and 5, the width of the annulus segments being the same or approximately the same. A further reduced diameter section 9 is illustrated. As indicated, standard cementing operations provide a cemented annulus which stabilizes the wellbore, but the effective diameter of the conducting passage is progressively and substantially reduced as the well is deepened.

Figure 2:
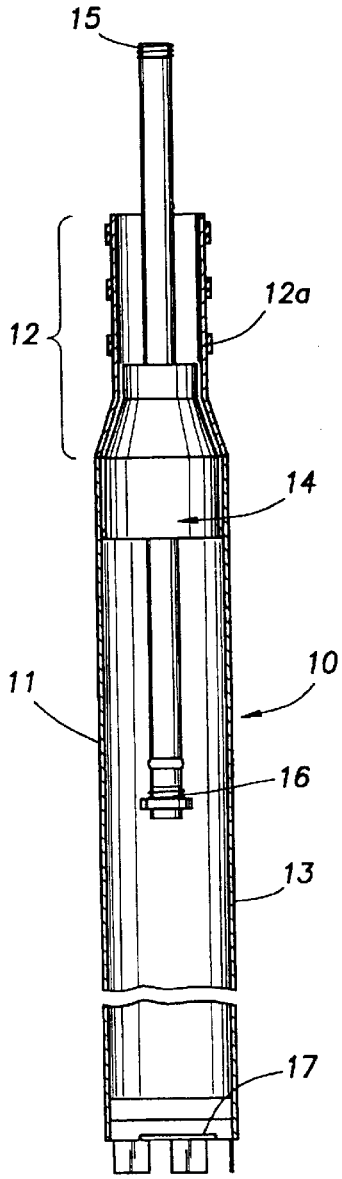
FIG. 2 illustrates schematically a liner and liner assembly according to the invention.

FIG. 2 illustrates an important aspect of the invention. Accordingly, in FIG. 2 there is shown a liner-die assembly designated generally as 10. The assembly includes the liner component 11 which, as shown, comprises a liner head section 12 which includes a section of reduced external and internal diameter coupled to a main body portion or remainder segment 13. In a practical case, the external diameter of the section of reduced external and internal diameter may be reduced from that of the remainder segment on the order of two inches or so, with a corresponding decrease in the internal diameter of the reduced diameter section. As will be understood by those skilled in the art, a "liner" or "casing" will be composed of segments or sections assembled and coupled by suitable means, such as by threading. In the present invention, the section of reduced external and internal diameter 12 may be formed in one or composed of more than one section of liner, it being recognized that the remainder section or segment will normally comprise many sections (30 ft.) to the end or bottom end thereof. Head section 12, which comprises a deformable material, preferably is connected to the main segment of the liner 13 by appropriate threading of the two segments. Alternately, not shown, the head section and a portion of the remainder or main body segment may be of integral construction. An elastic or compressible sleeve (e.g., rubber) or sleeves 12a may be provided on head section 12 or stability and sealing.

A preferred fluid tight die assembly, indicated generally as 14, and described more fully hereinafter, is provided. The preferred assembly 14 includes suitable mounting means or connecting means, such as a threaded connection 15, for connecting to a running string or other tool, and may be provided with threads or other suitable connecting means to connect to other tools, e.g., cementing operation components, indicated generally at 16, such as wiper plug launching apparatus, as described, for example, in U.S. Ser. No. 08/805,782, filed Feb. 25, 1997, by Gilbert Lavaure, Jason Jonas, and Bernard Piot, incorporated herein by reference. Liner segment 13 is provided with suitable partial sealing means 17, such as a differential fill-up collar, at or near the end of the liner opposite the suspending or connecting means, to allow ingress of fluid into the liner during insertion thereof in the enlarged wellbore, seal the liner from ingress of fluid from the wellbore after its insertion, and prevent egress of fluid from the bore of segment 13 (as described more fully hereinafter). As will be evident to those skilled in the art, a portion of the liner containing the die assembly may suitably be lowered into a wellbore as a unit, to the purpose that, upon completion of the cementing and deforming technique described more fully hereinafter, a suitable cemented liner combination of genuine advantage is provided.

Figure 3:
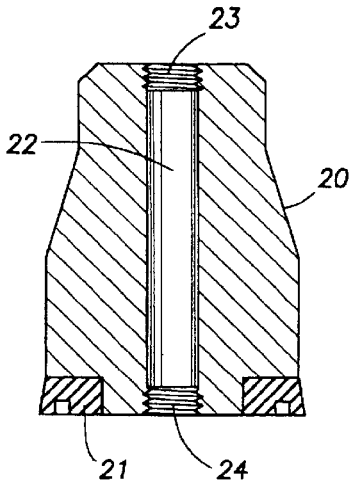
FIGS. 3 and 4 illustrate sectional views of liner expansion tools according to the invention.

FIG. 3 illustrates the simplest form of the die member assembly. Accordingly, there is shown a die member 20 of suitable shape and composition, such as hardened steel, and adapted or sized and shaped to expand a liner section of reduced diameter. Other suitable die forming materials are well known, and the particular die member material utilized is a matter of choice. In the illustration, the die member 20 comprises enlarged sections of variable diameter and is of generally frustoconical shape provided with suitable beveling in the segment of the die member where shaping of the liner section will be initiated, although other deforming shapes of the die member may be provided. In each application of the invention, the die member will be shaped or designed to provide an at least substantially uniform expanded or deformed liner segment of circular or approximately circular periphery, the die structure being selected to provide a periphery of the deformed and expanded segment equal to or approximating (slightly larger or less than) the periphery of the remainder segment of the liner. As will be recognized by those skilled in the art, die structures are known, for example, which will deform the reduced diameter segment to provide an expanded internal periphery slightly larger than that of the die. This aspect of the invention is preferred, since there is the possibility of a virtual force fit of the expanded section in the casing or upper liner.

In this illustration, the die member 20 further comprises a fluid tight seal 21, as previously described, such as a polymer cupseal, for sealing the die in a liner and allowing sufficient fluid pressure, as described hereinafter, to produce movement of the die member. The particular sealing material may be selected by those skilled in the art, a wide variety of sealing materials being suitable. For example, rubber or neoprene may also be utilized. The die member is provided with a bore or means 22 for transmitting a fluid in its center, and the bore terminates at both ends thereof with or in connecting means. Thus, threads are provided at 23 and 24 for connecting the die member to a running string or a tool, and suspending and/or positioning components, respectively.

Figure 4:
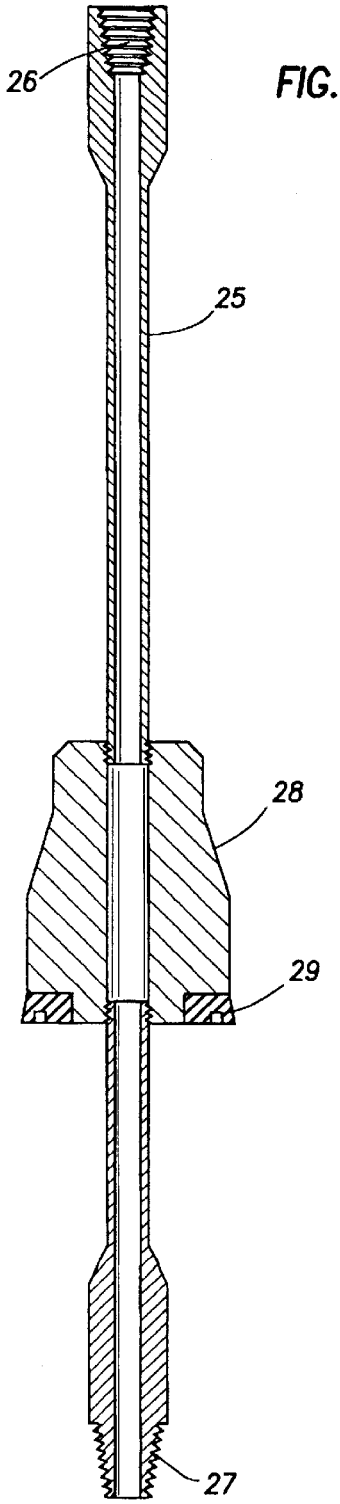

A preferred embodiment of the die assembly is illustrated in greater detail in FIG. 4. The die assembly shown comprises a pipe or generally tubular body 25 having threaded connecting means or segments 26 and 27 (box and pin) for connecting to a running string and suspending a tool or suitable cementing components in a liner, respectively. A die member 28 is provided on pipe 25 and is preferably of integral construction therewith, being of suitable shape and composition, as described with respect to FIG. 3, and adapted or sized and shaped in a similar manner to expand a liner section such as liner section 12. The connecting means, in whatever form employed, e.g., as also shown in FIG. 3, thus enables the positioning or adjustment of the position of the die member in a liner by movement, for example, of a drillstring attached thereto. If not of integral construction, die member 28 may be mounted on pipe 25 by suitable mounting means (not shown). In a manner similar to the embodiment of FIG. 3, the die member 28 comprises enlarged sections of variable diameter and is of generally frustoconical shape provided with suitable beveling in the segment of the die member where shaping of the liner section 12 will be initiated, although other deforming shapes of the die member may be provided. The die member 28 further comprises a fluid tight seal 29, as previously described.

Figure 7:
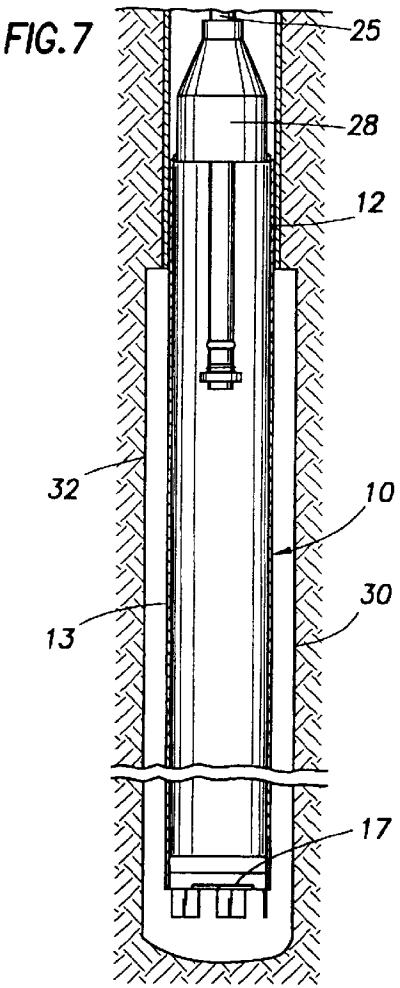
FIGS. 5 through 7 illustrate schematically the pipe expansion method or process of the invention.
Figure 6:
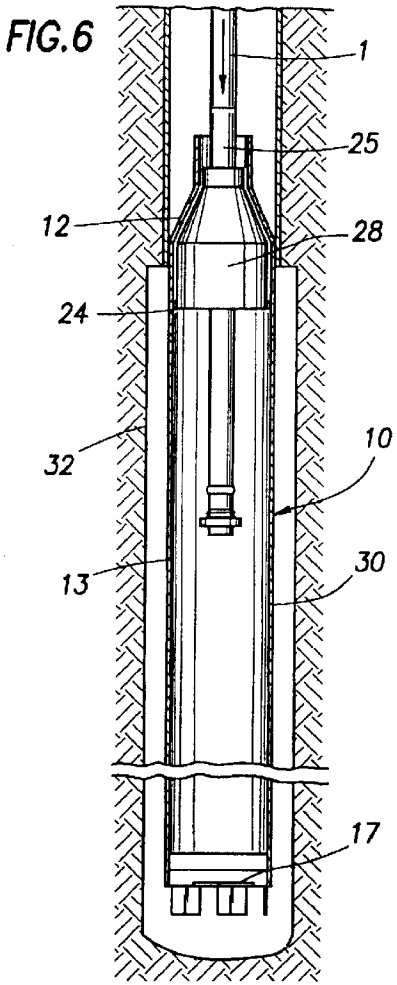
Figure 5:
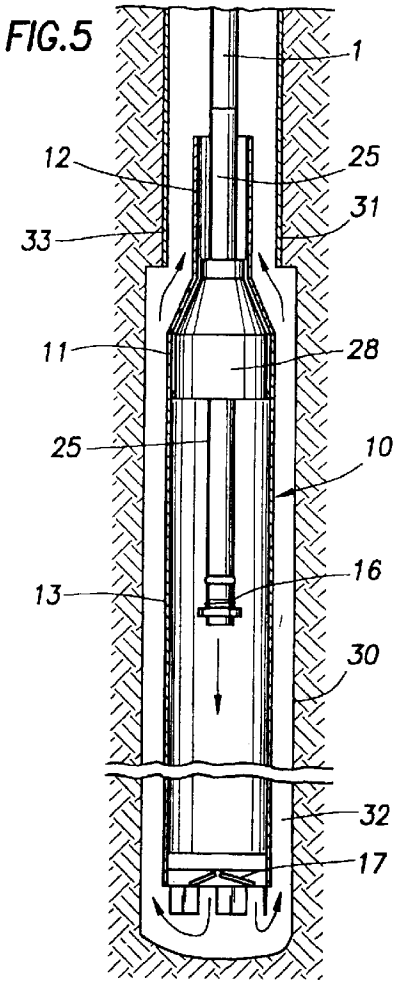

The procedure of the invention and operation of the liner 10 assembly and die assembly 14 are understood more fully by reference to schematic FIGS. 5 through 7. Elements previously described with respect to FIGS. 1 through 4 are referred to by identical numbers. Accordingly, in FIG. 5 the liner assembly is provided in a wellbore 30, such as an oil or gas well bore, and positioned in relation to cemented casing 31, as shown. Wellbore 30 has a diameter greater than the external diameter of casing 31, such wellbores being obtainable by use of a bi-center bit, under-reamer bit, or similar tool known to those skilled in the art. The external diameter of liner segment 13 is preferably slightly smaller than the internal diameter of casing 31, being just sufficiently smaller to allow lowering thereof through casing 31. The liner assembly is positioned in the enlarged wellbore, as shown, so that fluids, e.g., drilling mud or cement slurry, may be passed down the string 1 and via the pipe or bore 25 into the liner segment 13 or suitable tools or structure therein, described more fully hereinafter, out of the liner segment 13, and into the wellbore annulus 32, and through the annulus segment 33, which is formed by the external wall of section 12 and the lower portion of casing 31. Liner section 12 is formed, as mentioned, of a deformable liner material, such as a metal, e.g., steel or other alloy, which is suitable for liner duty. As used herein, the term "deformable" is understood in its common sense as indicating a capacity for shaping or expansion by suitable application of mechanical pressure. The fluid tight die assembly is positioned or disposed in the liner so that the longitudinal axes of the pipe and the liner are coincident. Pipe 25 may be of variable length and may or may not extend from liner 11. As will be evident to those skilled in the art, the invention is particularly adapted to use of liners of decreased wall thickness.

As previously mentioned, liner segment 13 is provided with suitable structure 17, at or near the end of the remainder segment of the liner, disposed from the die assembly, to allow ingress of fluid from the wellbore, such as a displacement fluid, during insertion of the liner, and sealing of the liner from ingress of cement slurry after cementing. In the usual case, a differential fill-up collar will be employed at or near the bottom of the liner to prevent wellbore fluids from entering the liner, and any suitable such collar or similar device may be employed. A variety of such devices are described in Well Cementing, edited by E. I. Nelson, Schlumberger Educational Services (1990), and the selection of a particular device is well within the ambit of those skilled in the art. Additionally, in order to seal the bottom of the liner after the cement has been placed in the wellbore annulus, as more fully described hereinafter, suitable sealing means, known to those skilled in the art, may be provided to prevent egress of fluid from the liner. Preferably, the wiper plug system described in the aforementioned Ser. No. 08/805,782 may be employed, to the effect that a fluid tight seal is formed at the end of the liner distant from the assembly, or the bottom of the liner.

In the position shown in FIG. 5, the liner assembly is especially adapted to a cementing operation, and hanger elements are not required since the liner assembly may be supported by the string 1. More particularly, following standard cementing procedures, cement slurry may be pumped downhole through the string 1 and through liner 11 via pipe 25 in the die assembly, through flow distributor 16, which may be that of the aforementioned wiper plug launching system, and out the bottom of the liner through open sealing means 17. The cement slurry displaces drilling fluid and/or a suitable spacer fluid between the cement slurry and the drilling fluid in the wellbore annulus, the drilling fluid and/or spacer fluid passing from annulus 32 into annulus 33 in casing 31 without substantial impediment. The advantage of the reduced cross section of segment 12, which permits flow of fluids out of the wellbore, is demonstrated at this juncture. Without such feature, the ultimate goal of a wider cross section for production fluids cannot be achieved because of the requirement for removal of fluids from the borehole annulus. Sufficient cement slurry is employed to fill the annulus 32. The invention now provides for expansion of section 12 to provide for a larger diameter cross section corresponding to that of section 13.

As shown in FIG. 6, sealing means 17 (schematically shown) at the bottom of liner section 13 is sealed to the ingress and egress of fluid. In the normal case, a wiper plug, which is solid, is sent downhole, after sufficient cement slurry has been sent into annulus 32, to seal, with the differential fillup collar, the bottom of liner to egress of fluid. As mentioned, the technique of the aforementioned Ser. No. 08/805,782 is preferred. Fluid pressure is then applied to the bore of the liner segment 13 by pumping a fluid through the pipe 25 into the bore of liner 13. Any suitable wellbore fluid or liquid available may be used, e.g., a displacement fluid, a completion fluid, water, or sea water. The fluid is pumped at sufficient pressure, e.g., 3000 psig, through pipe 25 to provide upward movement of die member 28 if the member is freed for movement. To this end, the position of the die assembly (including die member 28) is adjusted or allowed to adjust upward by gradual upward movement of the running string 1. Adjustment of the drillstring length is made at a rate sufficient to move the die member upward or allow upward movement thereof, caused by the pressure on the die, at a controlled rate, in response to such continued sufficient application of fluid pressure, the continued application of sufficient pressure being indicated by change in drillstring weight. As continuing sufficient fluid pressure moves die member 28 upward, its movement causes the die member 28 to expand and shape the deformable liner section 12 so that the section diameter and radial cross section thereof equals or approximates the diameter and radial cross section of the lower section 13. Further application of fluid pressure in the bore of liner 11 with continued adjustment of the position of die member 28 will free the die 28 from the liner 11, as shown in FIG. 7. The result of the deformation operation is the provision of an upper segment 12 of the liner 11 which now corresponds in size to that of lower segment 13. The cement is then allowed to set, producing a stabilized wellbore with increased flow capability over conventional liner sequence technique.

While the invention has been described with reference to specific embodiments, it is understood that various modifications and embodiments will be suggested to those skilled in the art upon reading and understanding this disclosure. Accordingly, it is intended that all such modifications and embodiments be included within the invention and that the scope of the invention be limited only by the appended claims.

What is claimed is:

1. A method of cementing a wellbore comprising providing a casing in a wellbore and drilling a further segment of enlarged wellbore;

providing in the enlarged wellbore, through the casing, a liner of smaller external diameter comprising a minor section of further reduced external and internal diameter composed of a deformable liner material, and a remainder segment having an external diameter approximating the internal diameter of the casing, containing a movable fluid tight die member in the bore thereof at a location in the bore distant from the bottom end of said remainder segment, the liner further comprising means for transmitting a fluid to the bore of the remainder segment below the fluid tight die member, through the fluid tight die member, the section of reduced external and internal diameter being positioned in the lower portion of said casing in such manner, and the remainder segment of the liner below the lower portion of the casing in the enlarged wellbore, so that fluid may circulate without substantial impediment in the annuli formed by said liner and the enlarged wellbore and casing;

pumping a cement slurry down the casing and through the liner, and into the wellbore annulus in an amount sufficient to cement said wellbore annulus;

sealing the bottom of the remainder segment of the liner;

transmitting a fluid to and applying sufficient fluid pressure to the bore of the remainder segment of the liner below the fluid tight die member to move the die member up the liner and expand said minor section, and allowing said fluid tight die member to move up the wellbore to provide an external diameter of the minor section equal to or approximating that of the remainder segment of the liner;

and removing the fluid tight die member from the expanded minor section and allowing the cement to set.

2. A method of cementing a wellbore comprising providing a first liner in a wellbore and drilling a further segment of enlarged wellbore;

providing in the enlarged wellbore, through the first liner, a second liner of smaller external diameter comprising a minor section of further reduced external and internal diameter composed of a deformable liner material, and a remainder segment having an external diameter approximating the internal diameter of the liner, containing a fluid tight die member in the bore thereof, at a location in the bore distant from the bottom end of said remainder segment, the liner further comprising means for transmitting a fluid to the bore of the remainder segment below the fluid tight die member, through the fluid tight die member, the section of reduced external and internal diameter being positioned in the lower portion of said first liner in such manner, and the remainder segment of the second liner below the lower portion of the first liner in the enlarged wellbore, so that fluid may circulate without substantial impediment in the annuli formed by said liner and the enlarged wellbore and first liner;

pumping a cement slurry down the first liner and through the second liner, and into the wellbore annulus in an amount sufficient to cement said wellbore annulus;

sealing the bottom of the remainder segment of the second liner;

transmitting a fluid to and applying sufficient fluid pressure to the bore of the remainder segment of the second liner below the fluid tight die member to move the die member up the liner and expand said minor section, and allowing said fluid tight die to move up the wellbore to provide an external diameter of the minor section equal to or approximating that of the remainder segment of the liner;

and removing the fluid tight die member from the expanded minor section and allowing the cement to set.

3. An improved wellbore liner for ameliorating subsequent casing diameter reduction, comprising a section of reduced external and internal diameter composed of a deformable liner material and a larger remainder segment of increased external and internal diameter, and a fluid tight die member disposed in the bore of the remainder segment, wherein the fluid tight die member comprises a means for transmitting a fluid therethrough, and comprising a means for sealing an end of said liner at a location removed from the fluid tight die member.

4. Apparatus comprising a die member adapted for expanding, at least substantially uniformly, the bore of a liner;

sealing means positioned on the periphery of said die member adapted to provide a fluid tight seal between the bore of a liner and said die member;

means for transmitting a fluid through the die member;

means for connecting the die member to a drillstring;

and means for suspending a tool from the die member.

5. Apparatus comprising a pipe, a die member adapted for expanding, at least substantially uniformly, the bore of a liner, on the periphery of said pipe, and sealing means positioned on the periphery of said die member adapted to provide a fluid tight seal between the bore of said liner and said die member.

6. The apparatus of claim 5 wherein the pipe is provided at one end thereof with means for connecting the pipe to a drillstring.

7. Apparatus comprising a pipe, a die member adapted for expanding, at least substantially uniformly, the bore of a liner, on the periphery of said pipe, and sealing means positioned on the periphery of said die member adapted to provide a fluid tight seal between the bore of said liner and said die member, and wherein said pipe is provided at one end thereof with a means for connecting the pipe and at the opposite end thereof, a means for suspending a tool.

8. A wellbore liner for ameliorating subsequent casing diameter reduction associated with subterranean drilling operations comprising (a) a section of reduced external and internal diameter composed of a deformable liner material and a larger remainder segment of increased external and internal diameter;

(b) a fluid tight die assembly disposed in said liner, said assembly comprising a fluid tight die member including a sealing means on the periphery of a pipe, the assembly disposed in said liner with the longitudinal axis of the pipe coincident with the axis of the liner and the fluid tight die member positioned in the remainder segment of the liner.

9. A wellbore liner comprising a section of reduced external and internal diameter composed of a deformable liner material and a larger remainder segment of increased external and internal diameter, and at least one sleeve composed of a compressible material mounted on the periphery of the section of reduced external and internal diameter.

10. The liner of claim 9 in which the compressible material is rubber.

11. A method of cementing a wellbore comprising providing a casing in a wellbore and drilling a further segment of enlarged wellbore;

providing in the enlarged wellbore, through the casing, and connected to a drillstring, a liner of smaller external diameter comprising a minor section of further reduced external and internal diameter composed of a deformable liner material, and a remainder segment having an external diameter approximating the internal diameter of the casing, containing a movable fluid tight die member in the bore thereof at a location in the bore distant from the bottom end of said remainder segment, the liner further comprising means for transmitting a fluid to the bore of the remainder segment below the fluid tight die member, through the fluid tight die member, the section of reduced external and internal diameter being positioned in the lower portion of said casing in such manner, and the remainder segment of the liner below the lower portion of the casing in the enlarged wellbore, so that fluid may circulate without substantial impediment in the annuli formed by said liner and the enlarged wellbore and casing;

pumping a cement slurry down the casing and through the liner, and into the wellbore annulus in an amount sufficient to cement said wellbore annulus;

sealing the bottom of the remainder segment of the liner;

transmitting a fluid to and applying sufficient fluid pressure to the bore of the remainder segment of the liner below the fluid tight die member to move the die member up the liner and expand said minor section, and moving said fluid tight die member up the wellbore in response to continued sufficient fluid pressure by adjusting the position of the drillstring upward, to provide an external diameter of the minor section equal to or approximating that of the remainder segment of the liner;

and removing the fluid tight die member from the expanded minor section and allowing the cement to set.

12. The method of claim 11 wherein the well is a hydrocarbon well.

*13. An improved wellbore liner for ameliorating subsequent casing diameter reduction, comprising a section of reduced external and internal diameter composed of a deformable liner material and a remainder segment of increased external and internal diameter, and a fluid tight die member disposed in the bore of the remainder segment, wherein the fluid tight die member comprises a means for transmitting a fluid there through, and comprising a means for sealing an end of said liner at a location removed from the fluid tight die member.*

*14. A wellbore liner for ameliorating subsequent casing diameter reduction associated with subterranean drilling operations comprising:*

*a. a section of reduced external and internal diameter composed of a deformable liner material and a remainder segment of increased external and internal diameter;*

*b. a fluid tight die assembly disposed in said liner, said assembly comprising a fluid tight die member including a sealing means on the periphery of a pipe, the assembly disposed in said liner with the longitudinal axis of the pipe coincident with the axis of the liner and the fluid tight die member positioned in the remainder segment of the liner.*

*15. A wellbore liner comprising a section of reduced external and internal diameter composed of an elastic liner material and a remainder segment of increased external and internal diameter, and at least one sleeve composed of a deformable material mounted on the periphery section of reduced external and internal diameter.*

*16. The liner of claim 15 in which the elastic material is rubber.*

* * * * *